United States Patent
Georgeson

(10) Patent No.: US 11,238,479 B1
(45) Date of Patent: Feb. 1, 2022

(54) DIGITAL PROMOTION PROCESSING SYSTEM INCLUDING MESSENGER BOT BASED TRIVIA QUESTION AND RELATED METHODS

(71) Applicant: INMAR CLEARING, INC., Winston-Salem, NC (US)

(72) Inventor: Nathanael Georgeson, Seattle, WA (US)

(73) Assignee: INMAR CLEARING, INC., Winston-Salem, NC (US)

(*) Notice: Subject to any disclaimer, the term of this patent is extended or adjusted under 35 U.S.C. 154(b) by 230 days.

(21) Appl. No.: 16/165,629

(22) Filed: Oct. 19, 2018

(51) Int. Cl.
*G06Q 30/02* (2012.01)
*H04L 12/58* (2006.01)
*G06F 16/54* (2019.01)

(52) U.S. Cl.
CPC ......... *G06Q 30/0212* (2013.01); *G06F 16/54* (2019.01); *G06Q 30/0267* (2013.01); *H04L 51/02* (2013.01); *H04L 51/38* (2013.01)

(58) Field of Classification Search
None
See application file for complete search history.

(56) References Cited

U.S. PATENT DOCUMENTS

| | | | |
|---|---|---|---|
| 5,916,024 A * | 6/1999 | Von Kohorn | H04N 7/0806 463/40 |
| 7,549,924 B2 | 6/2009 | Canessa et al. | |
| 8,052,518 B1 * | 11/2011 | Kelly | G07F 17/32 463/25 |
| 2001/0032133 A1 * | 10/2001 | Moran | G06Q 30/0208 705/14.11 |
| 2002/0160838 A1 | 10/2002 | Kim | |
| 2006/0287029 A1 * | 12/2006 | Yoshinobu | A63F 13/46 463/9 |
| 2009/0177541 A1 * | 7/2009 | Martel | G06Q 30/02 705/14.14 |

(Continued)

FOREIGN PATENT DOCUMENTS

WO    WO-02073494 A1 *  9/2002  ............. G06Q 30/02

OTHER PUBLICATIONS

Georgeson; "Digital Promotion Processing System Including Messenger Bot Based Image Scoring And Related Methods" U.S. Appl. No. 16/165,553; filed Oct. 19, 2018; (cited application is stored in the USPTO's IFW system).

*Primary Examiner* — Marie P Brady
(74) *Attorney, Agent, or Firm* — Allen, Dyer, Doppelt, + Gilchrist, P.A. Attorneys at Law

(57) ABSTRACT

A digital promotion processing system may include mobile wireless communications devices, each associated with a respective user and a digital promotion server. The digital promotion server may be configured to operate a messenger bot to prompt each of the users to answer a trivia question from the respective mobile wireless communications device and operate the messenger bot to obtain answers to the trivia question from the mobile wireless communications devices. The digital promotion server may be configured to determine a first respective user to answer the trivia question correctly based upon the obtained answers, and generate a digital promotion for a given product and communicate the digital promotion to the mobile wireless communications device associated with the first user to answer the trivia question correctly.

20 Claims, 6 Drawing Sheets

(56) References Cited

U.S. PATENT DOCUMENTS

| | | | |
|---|---|---|---|
| 2014/0279050 A1* | 9/2014 | Makar | G06F 16/9535 |
| | | | 705/14.66 |
| 2014/0351350 A1 | 11/2014 | Lee et al. | |
| 2015/0170325 A1* | 6/2015 | Abecassis | G11B 27/28 |
| | | | 345/2.1 |
| 2016/0086205 A1* | 3/2016 | Dove | H04W 4/02 |
| | | | 705/7.32 |
| 2020/0044998 A1* | 2/2020 | Jeon | G06Q 30/0252 |

\* cited by examiner

DIGITAL PROMOTION PROCESSING SYSTEM INCLUDING MESSENGER BOT BASED TRIVIA QUESTION AND RELATED METHODS

TECHNICAL FIELD

The present invention relates to the field of electronics, and, more particularly, to the display and processing of digital promotions, and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

An electronic messenger program or instant messenger is a computer program that permits real time text transmission over a computer network, for example, the Internet. One type of electronic messenger program or instant messenger is a chat or messenger bot, which is a computer program that provides conversation, for example, by way of text. The conversation may mimic human conversation. A messenger bot may be particularly useful for customer service or information acquisition applications.

SUMMARY

A digital promotion processing system may include a plurality of mobile wireless communications devices, each associated with a respective user, and a digital promotion server. The digital promotion server may be configured to operate a messenger bot to prompt each of the users to answer a trivia question from the respective mobile wireless communications device and operate the messenger bot to obtain answers to the trivia question from the plurality of mobile wireless communications devices. The digital promotion server may be configured to determine a first respective user to answer the trivia question correctly based upon the obtained answers, and generate a digital promotion for a given product and communicate the digital promotion to the mobile wireless communications device associated with the first user to answer the trivia question correctly.

The digital promotion server may be configured to communicate the digital promotion to the mobile wireless communications device via the messenger bot. The trivia question may have a difficulty level associated therewith, and the digital promotion may have a redeemable value associated with the difficulty level. The digital promotion server may be configured to adjust the redeemable value based upon the associated difficulty level, for example.

The digital promotion server may be configured to operate the messenger bot to communicate obtained answers from other mobile wireless communications devices, for example. The digital promotion server may be configured to communicate, via the messenger bot, a time expiration for permitting the users to answer the trivia question. The digital promotion server may be configured to communicate an incorrect answer notification to respective mobile wireless communications devices based upon a respective incorrect answer to the trivia question, for example.

The digital promotion may have a redeemable value associated therewith. The digital promotion server may be configured to adjust the redeemable value based upon an amount of elapsed time from prompting each of the users to answer the trivia question to determining the first respective user to answer the trivia question correctly based upon the obtained answers, for example.

The digital promotion server may be configured to generate the digital promotion for the given product from among a plurality of products based upon the trivia question, for example. The digital promotion server may be configured to collect information from the messenger bot comprising at least one of a user name, social media profile, user date of birth, user geographic location, and desired product, for example.

A method aspect is directed to a method of processing a digital promotion. The method may include using a digital promotion server to operate a messenger bot to prompt each of a plurality of users to answer a trivia question from an associated respective mobile wireless communications device from among a plurality thereof. The method may also include using the digital promotion server to operate the messenger bot to obtain answers to the trivia question from the plurality of mobile wireless communications devices, and determine a first respective user to answer the trivia question correctly based upon the obtained answers. The method may also include using the digital promotion server to generate a digital promotion for a given product and communicate the digital promotion to the mobile wireless communications device associated with the first user to answer the trivia question correctly.

A computer readable medium aspect is directed to a non-transitory computer readable medium comprising computer executable instructions that when executed by a processor cause the processor to perform operations. The operations may include operating a messenger bot to prompt each of a plurality of users to answer a trivia question from an associated respective mobile wireless communications device from among a plurality thereof, and operating the messenger bot to obtain answers to the trivia question from the plurality of mobile wireless communications devices. The operations may also include determining a first respective user to answer the trivia question correctly based upon the obtained answers, and generating a digital promotion for a given product and communicate the digital promotion to the mobile wireless communications device associated with the first user to answer the trivia question correctly.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
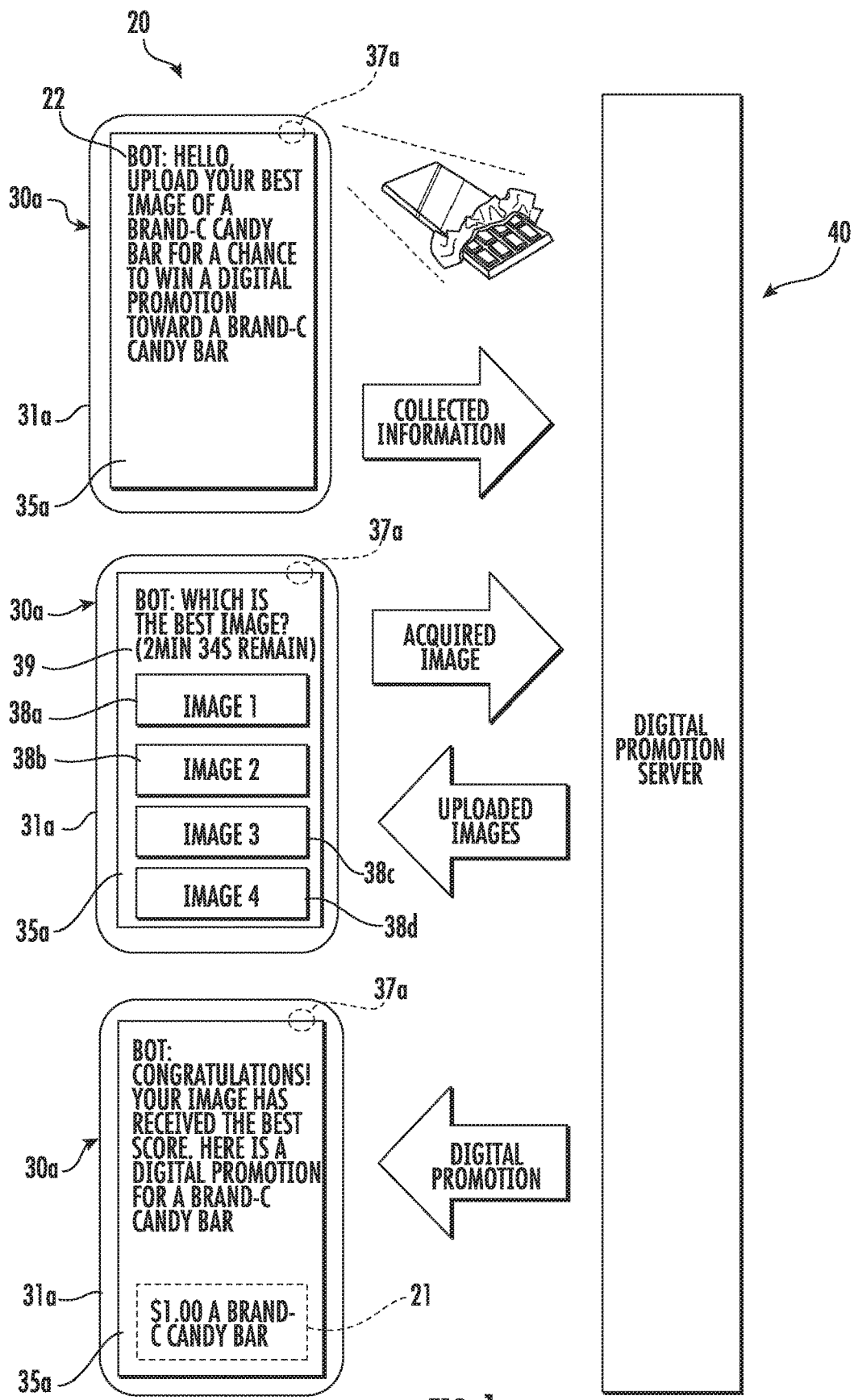
FIG. 1 is a schematic diagram of a digital promotion processing system according to an embodiment.
Figure 2:
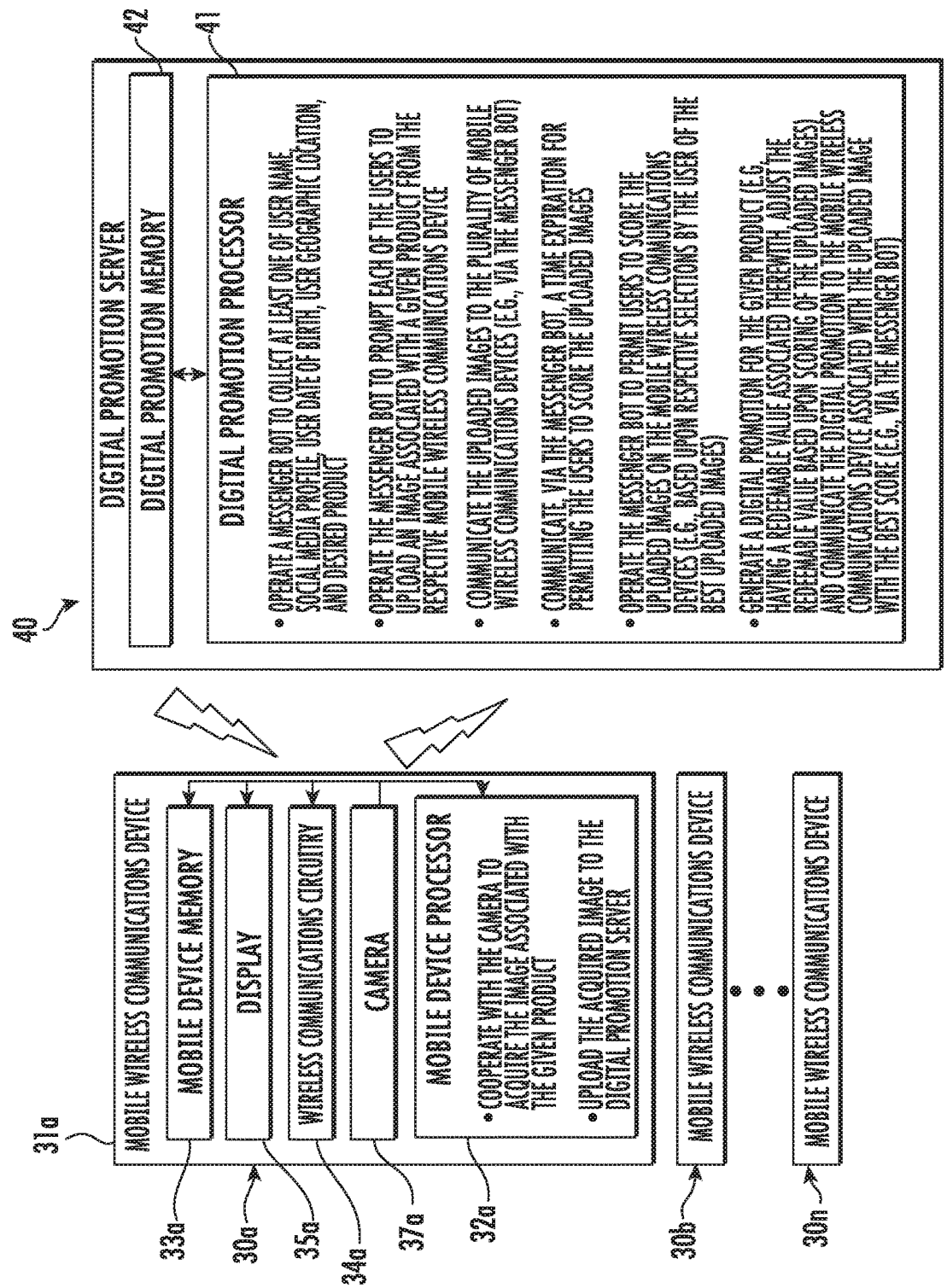
FIG. 2 is a schematic block diagram of the system of FIG. 1.

Referring initially to FIGS. 1 and 2, a digital promotion processing system 20 includes mobile wireless communications devices 30a-30n, each associated with a respective user. Each mobile wireless communications device 30a illustratively includes a portable housing 31a, a mobile device processor 32a, a mobile device memory 33a coupled to the mobile device processor, and wireless communications circuitry 34a coupled to the mobile device processor. Each mobile wireless communications device 30a also includes a display 35a, such as, for example, a touch display, carried by the portable housing 31a and coupled to the mobile device processor 32a. Each mobile wireless communications device 30a-30n may include one or more input devices, for example, a camera 37a and other types of output devices. Each mobile wireless communications device 30a may be a mobile phone or smartphone, a tablet computer, or other type of mobile wireless communications device, as will be appreciated by those skilled in the art.

The system 20 also includes a digital promotion server 40. The digital promotion server 40 includes a processor 41 and a memory 42 cooperating with the processor. The digital promotion server 40 may be a remote computer, for example.

Figure 3:
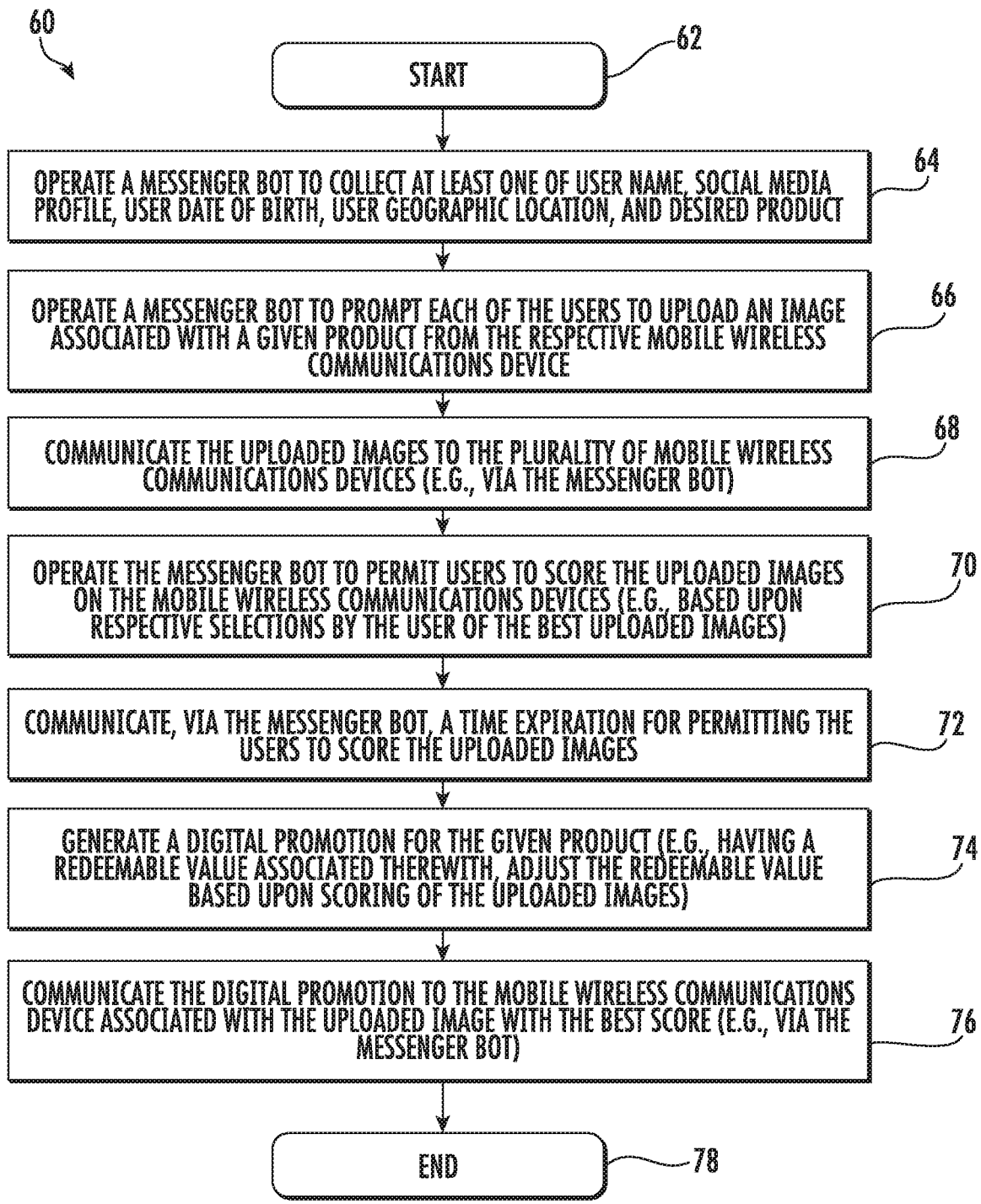
FIG. 3 is a flow diagram illustrating operation of a digital promotion server of the system of FIG. 1.

Referring now additionally to the flowchart 60 in FIG. 3, details of operation of the system 20 will now be described with reference to the digital promotion server 40. It should be understood that while operations are described with respect to the digital promotion server 40, the operations are performed based upon cooperation between the digital promotion processor 41 and the digital promotion memory 42.

Beginning at Block 62, the digital promotion server 40 operates a messenger bot 22, for example that may be associated with a given product or brand of products. The messenger bot 22 is operated by the digital promotion server 40 on the mobile wireless communications devices 30a-30n. The digital promotion server 40 operates the messenger bot 22 to collect information from a user (Block 64). For example, through the messenger bot 22, the digital promotion server 40 may obtain the given user's name, social media username, email address, social media profile, date of birth, geographic location, and/or desired product from the brand. Of course, the digital promotion server 40 may collect other and/or additional types of information.

At Block 66, the digital promotion server 40 operates the messenger bot 22 to prompt each of the users to upload an image associated with a given product from the respective mobile wireless communications device 30a-30n. For example, each user may acquire the image associated with the given product from the respective camera 37a. The acquired image may be of the product in use or an environmental use of the given product. The given product may be associated with a brand or may include a brand of products. In an exemplary implementation, the given product may be a food item, for example, a Brand-C Candy Bar.

Those skilled in the art will appreciate that the messenger bot 22 may be implemented in the form of a two-way dialog box that permits the given user to communicate by way of typing (i.e., written communication). In some embodiments, the messenger bot 22 may operate through voice commands or spoken words. The underlying program behind the messenger bot 22 may be a different program, application, and/or website than that serving the digital promotion 21. For example, the messenger bot 22 may be executed through the Facebook Messenger program or application.

At Block 68, the digital promotion server 40 communicates, for example, wirelessly, the uploaded images to the mobile wireless communications devices 30a-30n for display thereon. In other words, the digital promotion server 40 communicates all or some of the uploaded images 38a-38d to each mobile wireless communications device 30a-30n. The uploaded images are displayed, via the messenger bot 22, on each wireless communications device 30a-30n. With respect to the implementation example, the digital promotion server 40 receives or obtains images 38a-38d of Brand-C Candy Bars and communicates those obtained images to the mobile wireless communications devices 30a-30n via the messenger bot 22.

The digital promotion server 40 operates the messenger bot 22 to permit the users to score the uploaded images 38a-38d on the mobile wireless communications devices 30a-30n (Block 70). For example, the digital promotion server 40 may operate the messenger bot 22 to permit users to score the uploaded images 38a-38d based upon respective selections by the users, of a best uploaded image. In other words, a given user may score the uploaded images 38a-38d relative to a scale (e.g., 10=best, 1=worst) or make a yes/no decision as to whether the given user likes or approves of selected uploaded images. Other and/or additional scoring techniques may be implemented. With respect to the implementation example, the digital promotion server 40 permits the users to score the images 38a-38d of the Brand-C Candy Bars (e.g., the most creative, funny, etc.) and/or pick the best or most liked image or images.

At Block 72, the digital promotion server 40 may communicate, via the messenger bot 22, a time expiration 39 for permitting the users to score the uploaded images 38a-38d. More particularly, the digital promotion server 40 may set a time limit as to when scoring on the uploaded images 38a-38d ends. The time expiration 39 may be displayed on the display 35a of the mobile wireless communications devices 30a-30n, for example, and may be in the form of a countdown timer. Of course, the time expiration 39 may take on another form.

The digital promotion server 40 may maintain the scoring of the uploaded images 38a-38d from the mobile wireless communications devices 30a-30n. At Block 74, the digital promotion server 40 generates a digital promotion 21 for the given product and communicates the digital promotion to the mobile wireless communications device 30a-30n associated with the uploaded image 38a-38d with a best score (Block 76). The digital promotion 21 may be communicated via the messenger bot 22, for example.

The digital promotion 21 may be in the form of a digital coupon or digital rebate, for example. The digital promotion 21 has a redeemable value associated therewith.

The digital promotion server 40 may adjust the redeemable value based upon the scoring of the uploaded images 38a-38d. For example, the digital promotion server 40 may adjust the redeemable value of the digital promotion 21 upwardly based upon a higher score relative to other scores. Of course, if a given image 38a-38d obtains a best score, but not by a relatively large margin, then the digital promotion server 40 may adjust the redeemable value little if any, for example, relative to a baseline redeemable value.

The digital promotion 21 may be stored in a digital wallet, for example, associated with the mobile wireless communications device 30a associated with the best score. The digital promotion 21 may be redeemed at a point-of-sale (POS) terminal at a retailer during a purchase transaction. For example, the POS terminal may cooperate with the digital promotion server 40 to verify and apply the digital promotion 21 to the given product during the purchase transaction. Operations end at Block 78.

A method aspect is directed to a method of processing a digital promotion 21. The method includes using a digital promotion server 40 to operate a messenger bot 22 to prompt each of the users to upload an image 38a-38d associated with a given product from a respective mobile wireless communications device 30a-30n from among a plurality thereof, each associated with a respective user. The method also includes using the digital promotion server 40 to communicate the uploaded images 38a-38d to the plurality of mobile wireless communications devices 30a-30n for display thereon, and operate the messenger bot 22 to permit the users to score the uploaded images on the plurality of mobile wireless communications devices. The method further includes using the digital promotion server 40 to generate a digital promotion 21 for the given product and communicate the digital promotion to the mobile wireless communications device 30a-30n associated with the uploaded image 38a-38d with a best score.

A computer readable medium aspect is directed to a non-transitory computer readable medium for processing a digital promotion 21. The non-transitory computer readable medium includes computer executable instructions that when executed by a processor 41 cause the processor to perform operations. The operations include operating a messenger bot 22 to prompt each of the users to upload an image 38a-38d associated with a given product from a respective mobile wireless communications device 30a-30n from among a plurality thereof, each associated with a respective user. The operations also include communicating the uploaded images 38a-38d to the plurality of mobile wireless communications devices 30a-30n for display thereon and operating the messenger bot 22 to permit the users to score the uploaded images on the plurality of mobile wireless communications devices. The operations also include generating a digital promotion 21 for the given product and communicate the digital promotion to the mobile wireless communications device 30a-30n associated with the uploaded image 38a-38d with a best score.

Figure 4:
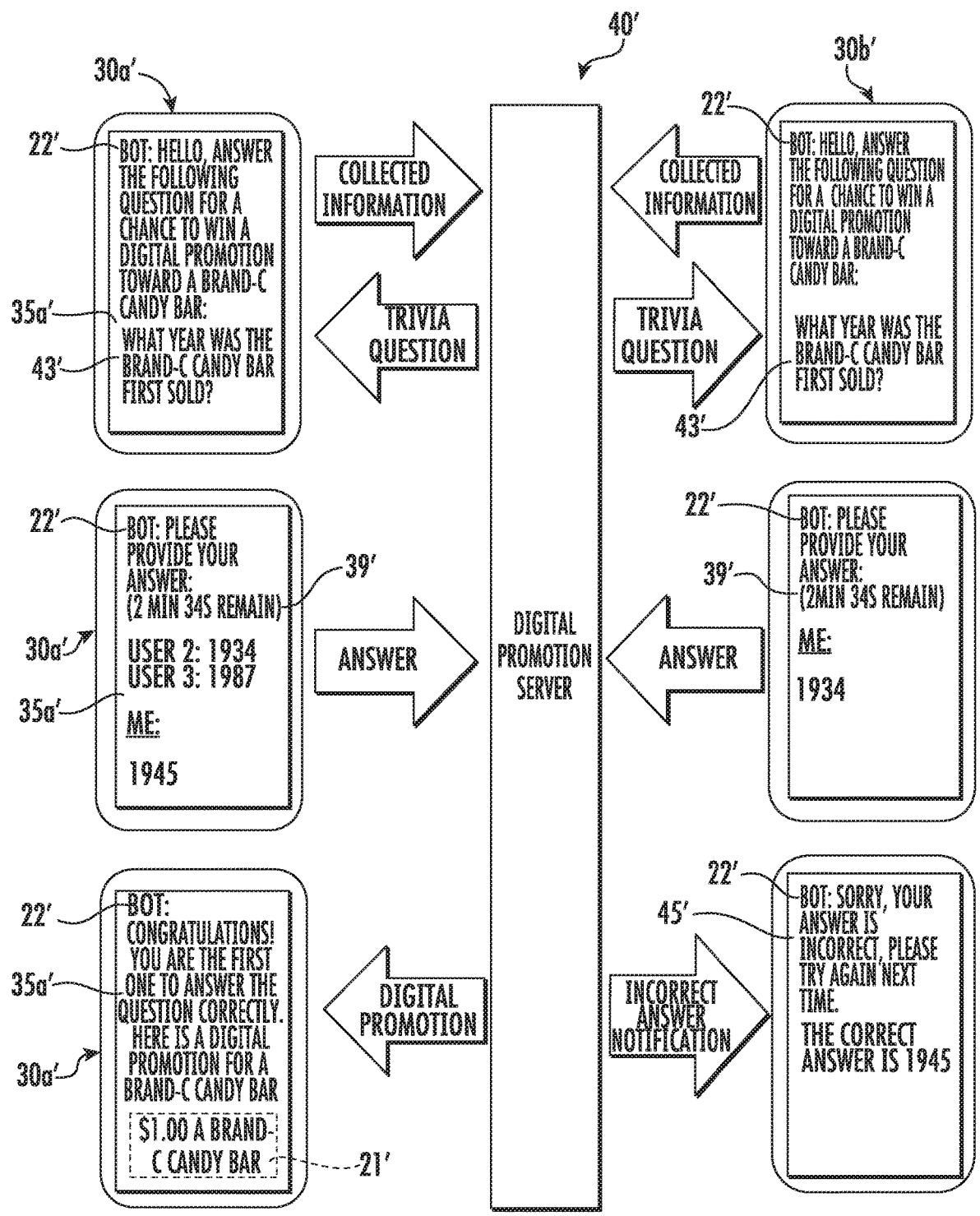
FIG. 4 is a schematic diagram of a digital promotion processing system according to another embodiment.
Figure 5:
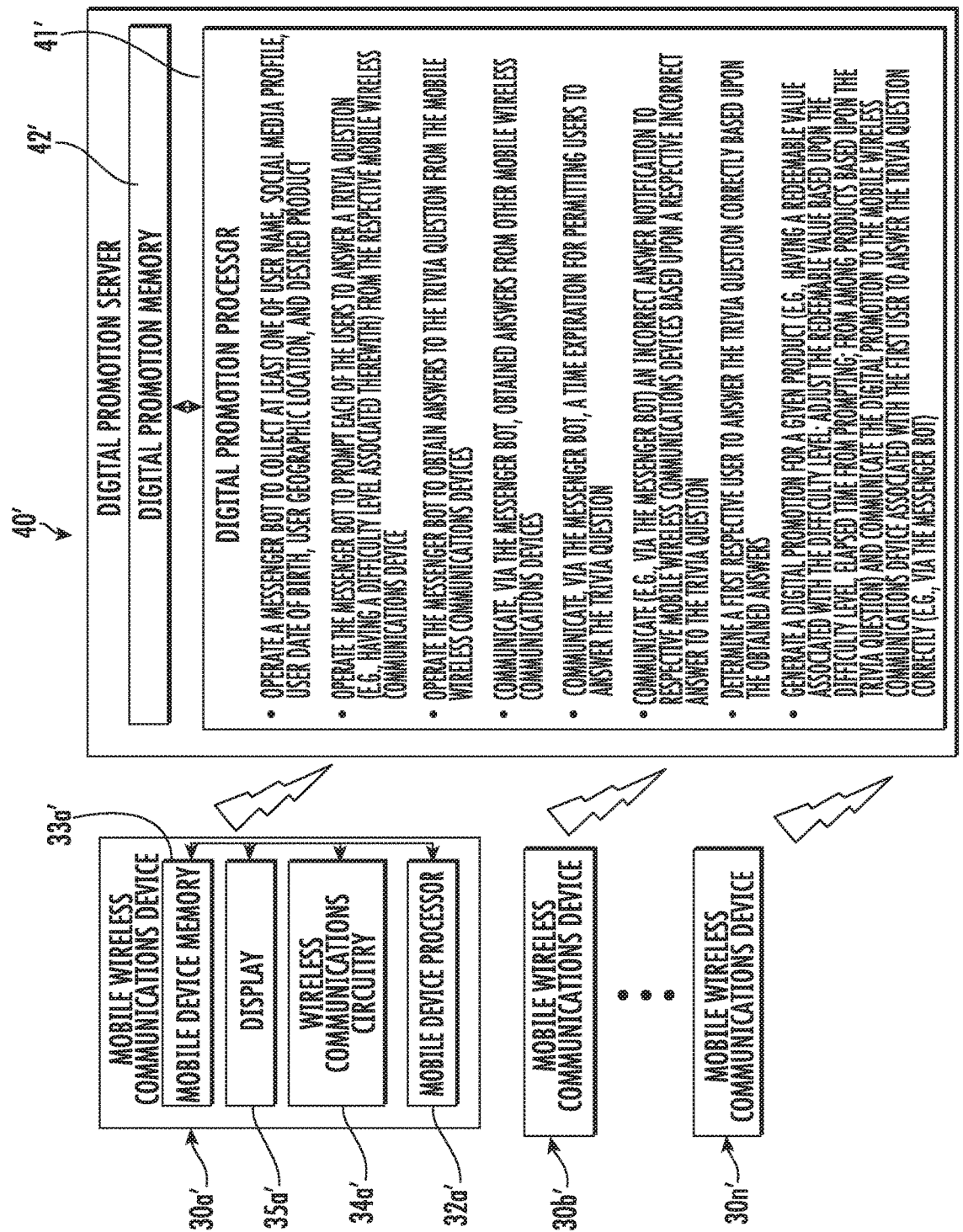
FIG. 5 is a schematic block diagram of the system of FIG. 4.
Figure 6:
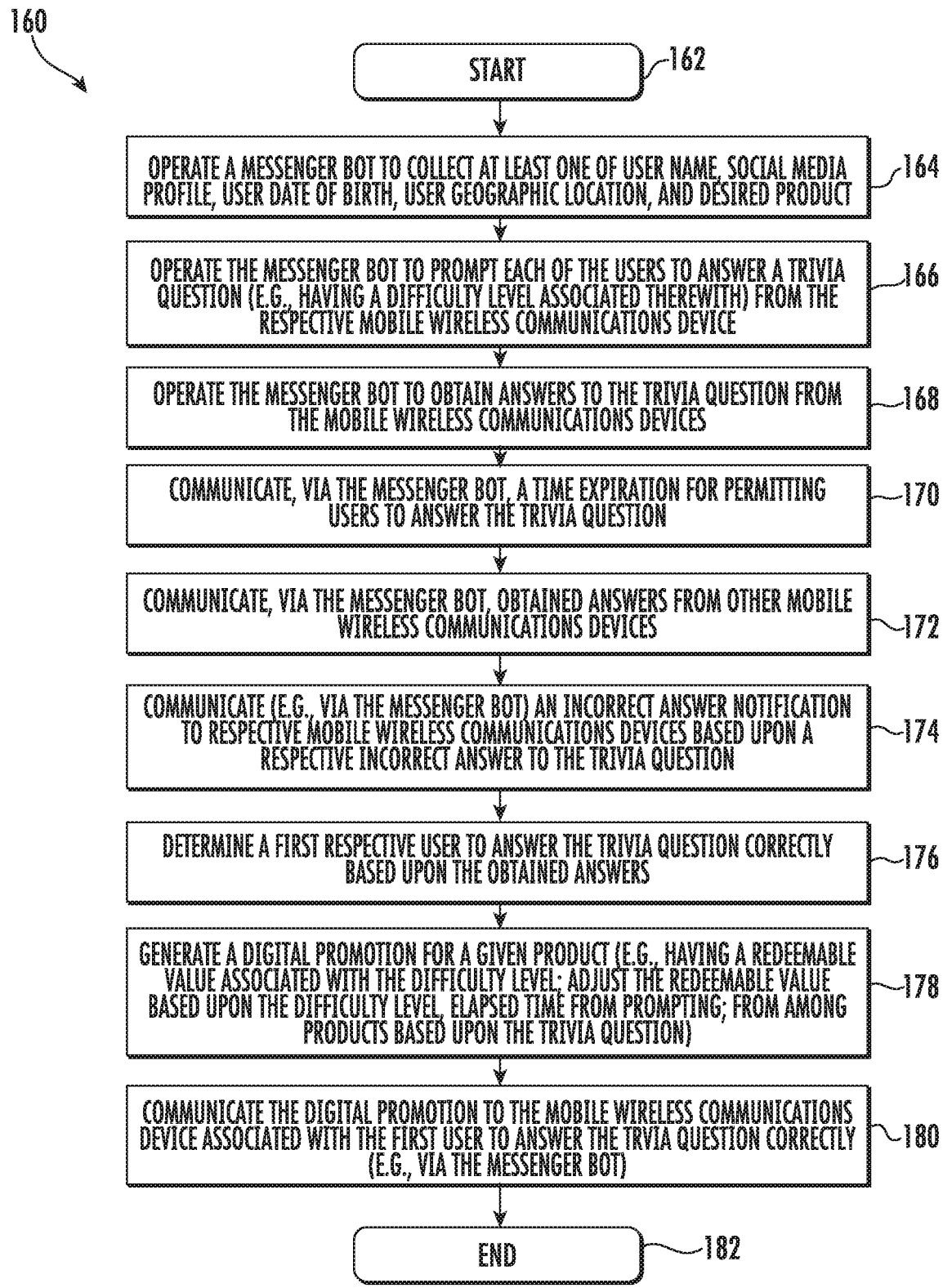
FIG. 6 is a flow diagram illustrating operation of a digital promotion server of the system of FIG. 4.

Referring now to FIGS. 4-5, and the flowchart 160 in FIG. 6, beginning at Block 162, in another embodiment, the digital promotion server 40' operates a messenger bot 22', for example that may be associated with a given product or brand of products. The messenger bot 22' is operated by the digital promotion server 40' on the mobile wireless communications devices 30a'-30n' to collect information from a user (Block 164). For example, through the messenger bot 22', the digital promotion server 40' may obtain the given user's name, social media username, email address, social media profile, date of birth, geographic location, and/or desired product from the brand. Of course, the digital promotion server 40' may collect other and/or additional types of information.

At Block 166, the digital promotion server 40' operates the messenger bot 22' to prompt each of the users to answer a trivia question 43' from the respective mobile wireless communications device 30a'-30n'. For example, the digital promotion server 40' may prompt the users to answer a trivia question 43' associated with a brand of product from among different brands or products. The digital promotion server 40' may select a given trivia question 43' from among the different questions, for example, stored in the memory 42'. The selected trivia question 43' may have a difficulty level associated therewith. In other words, some trivia questions 43' may be more difficult to answer than other trivia questions.

The digital promotion server 40', at Block 168, operates the messenger bot 22' to obtain answers to the trivia questions 43' from the mobile wireless communications device 30a'-30n', for example, via the messenger bot 22'. More particularly, the users may provide answers through the messenger bot 22', which are communicated, for example, wirelessly, to the digital promotion server 40'.

At Block 170, the digital promotion server 40' may communicate, via the messenger bot 22', a time expiration 39' for permitting the users to answer the trivia question 43'. More particularly, the digital promotion server 40' may set a time limit as to when answering of the trivia question 43' ends. The time expiration 39' may be displayed on the display 35a', 35b' of the mobile wireless communications devices 30a'-30n', for example, and may be in the form of a countdown timer. Of course, the time expiration 39' may take on another form. In other words, users are given a fixed time period to respond or answer the trivia questions.

As answers to the trivia question 43' are received by the digital promotion server 40', the digital promotion server may operate the messenger bot 22' to communicate obtained answers from other mobile wireless communications devices 30a'-30n' (Block 172) and communicate an incorrect answer notification 45' to respective mobile wireless communications devices 30a'-30n' (Block 174). In other words, if an incorrect answer is provided by a respective mobile wireless communications device 30a'-30n', the digital promotion server 40' may communicate to the respective mobile wireless communications device that the provided answer is incorrect. The notification 45' may be in the form of the dialog box, for example, or may be another type of notification.

The digital promotion server 40' determines a first respective user to answer the trivia question 43' correctly based upon the obtained answers (Block 176). In other words, the digital promotion server 40' collects answers to the trivia questions 43' from the mobile wireless communications devices 30a'-30n' until a correct answer is obtained.

At Block 178, the digital promotion server 40' generates a digital promotion 21' for a given product, for example, from among the different products. The digital promotion 21' has a redeemable value associated therewith. The digital promotion server 40' may adjust the redeemable value based upon the associated difficulty level. For example, a harder trivia question may correspond to a digital promotion 21' having a higher redeemable value. Alternatively or additionally, the digital promotion server 40' may adjust the redeemable value based upon an amount of elapsed time from prompting each of the users to answer the trivia question 43' (Block 178) to determining the first respective user to answer the trivia quest correctly based upon the obtained answers (Block 176). For example, a harder trivia question 43' may be correspond to a digital promotion 21' having a higher redeemable value.

The digital promotion 21' is communicated to the mobile wireless communications device 30a'-30n' (e.g., wirelessly) associated with the first user to answer the trivia question 43' correctly, for example, via the messenger bot 22' at Block 180. The operations end at Block 182.

A method aspect is directed to a method of processing a digital promotion 21'. The method includes using a digital promotion server 40' to operate a messenger bot 22' to prompt each of the users to answer a trivia question 43' from a respective mobile wireless communications device 30a'-30n' from among a plurality thereof, each associated with a respective user. The method also includes using the digital promotion 21' server to operate the messenger bot 22' to obtain answers to the trivia question 43' from the plurality of mobile wireless communications devices 30a'-30n', and determine a first respective user to answer the trivia question correctly based upon the obtained answers. The method also includes using the digital promotion server 40' to generate a digital promotion 21' for a given product and communicate the digital promotion to the mobile wireless communications device 30a'-30n' associated with the first user to answer the trivia question correctly.

A computer readable medium aspect is directed to a non-transitory computer readable medium that includes computer executable instructions that when executed by a processor 41' cause the processor to perform operations. The operations include operating a messenger bot 22' to prompt each of the users to answer a trivia question 43' from a respective mobile wireless communications device 30a'-30n' from among a plurality thereof, each associated with a respective user, and operating the messenger bot 22' to obtain answers to the trivia question from the plurality of mobile wireless communications devices. The operations also include determining a first respective user to answer the trivia question 43' correctly based upon the obtained answers, and generating a digital promotion 21' for a given product and communicate the digital promotion to the mobile wireless communications device 30a'-30n' associated with the first user to answer the trivia question correctly.

In some embodiments, the digital promotion server 40 may perform other and/or additional gamification functions, for example, via the messenger bot 22. Some games may include providing additional digital promotions or rewards for multiple purchases, or providing larger redeemable values for "streaks" or playing games "N" days in a row. Another game executed by the digital promotion server 40 may include users drawing their "best" picture of an object, for example, associated with a brand and within a threshold time period.

In another embodiment, the games executed by the digital promotion server 40 may be based upon geographic location of the user or the mobile wireless communications device 30a-30n. For example, a user may visit or check-in at different locations to receive a promotion or a given unknown location based upon clues (e.g., a scavenger hunt).

While several embodiments have been described herein, it should be appreciated by those skilled in the art that any one or more elements from any one or more embodiments may be used with any one or more elements from one or more other embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A digital promotion processing system comprising:
   a plurality of mobile wireless communications devices, each associated with a respective user and each comprising a display; and
   a digital promotion server configured to
      operate a messenger bot permitting a two-way dialog between each respective user and the messenger bot to
         for each respective user, within the two-way dialog of the messenger bot, generate a dialog on the display prompting each respective user to answer a trivia question within an allotted time period displayed on the display in the form of a countdown timer adjacent the trivia question, the trivia question being answered by providing input within the dialog via the messenger bot, from respective ones of the plurality of mobile wireless communications devices, the trivia question having a difficulty level associated therewith,
         obtain answers to the trivia question from the plurality of mobile wireless communications devices, and
         for each respective user, display on the display, within the dialog via the messenger bot, on each respective one of the plurality of mobile wireless communications devices, the answers obtained to the trivia question from other respective ones of the plurality of mobile wireless communications devices,
      determine a first respective user to answer the trivia question correctly based upon the answers obtained by the messenger bot,
      determine an elapsed time between determining the first respective user to answer the trivia question correctly and prompting each of the respective users to answer the trivia question,
      generate a digital promotion having an initial redeemable value and for a given product,
      adjust the initial redeemable value of the digital promotion based upon the difficultly level and the elapsed time so that the initial redeemable value increases with a higher difficulty level and the redeemable value decreases as the elapsed time increases, and
      communicate, within the dialog via the messenger bot on the display, the digital promotion to the mobile wireless communications device associated with the first respective user to answer the trivia question correctly.

2. The system of claim 1 wherein the digital promotion server is configured to communicate an incorrect answer notification, within the dialog via the messenger bot, to respective mobile wireless communications devices based upon a respective incorrect answer to the trivia question.

3. The system of claim 1 wherein the digital promotion server is configured to generate the digital promotion for the given product from among a plurality of products based upon the trivia question.

4. The system of claim 1 wherein the digital promotion server is configured to collect information from the messenger bot comprising at least one of a user name, social media profile, user date of birth, user geographic location, and desired product.

5. A digital promotion processing server comprising:
   a processor and an associated memory cooperating therewith to
     operate a messenger bot permitting a two-way dialog between each respective user of a plurality of users and the messenger bot to
        for each respective user, within the two-way dialog of the messenger bot, generate a dialog on a display of an associated mobile wireless communications device from among a plurality thereof, prompting each respective user to answer a trivia question within an allotted time period displayed on the display in the form of a countdown timer adjacent the trivia question, the trivia question being answered by providing input within the dialog via the messenger bot, from the associated respective mobile wireless communications device and having the display displaying the dialog thereon, the trivia question having a difficulty level associated therewith,
        obtain answers to the trivia question from the plurality of mobile wireless communications devices, and
        for each respective user, display on the display, within the dialog via the messenger bot, on each respective one of the plurality of mobile wireless communications devices, the answers obtained to the trivia question from other respective ones of the plurality of mobile wireless communications devices,
     determine a first respective user to answer the trivia question correctly based upon the answers obtained by the messenger bot,
     determine an elapsed time between determining the first respective user to answer the trivia question correctly and prompting each of the respective users to answer the trivia question,
     generate a digital promotion having an initial redeemable value and for a given product,
     adjust the initial redeemable value of the digital promotion based upon the difficultly level and the elapsed time so that the initial redeemable value increases with a higher difficulty level and the redeemable value decreases as the elapsed time increases, and
     communicate, within the dialog via the messenger bot on the display, the digital promotion to the mobile wireless communications device associated with the first respective user to answer the trivia question correctly.

6. The digital promotion processing server of claim 5 wherein the processor and memory cooperate to communicate, via the messenger bot, a time expiration for permitting the users to answer the trivia question.

7. The digital promotion processing server of claim 5 wherein the processor and memory cooperate to communicate an incorrect answer notification to respective mobile wireless communications devices based upon a respective incorrect answer to the trivia question.

8. A method of processing a digital promotion comprising:
   using a digital promotion server to
     operate a messenger bot permitting a two-way dialog between each respective user of a plurality of users and the messenger bot to
        for each respective user, within the two-way dialog of the messenger bot, generate a dialog on a display of an associated mobile wireless communications device from among a plurality thereof prompting each respective user to answer a trivia question within an allotted time period displayed on the display in the form of a countdown timer adjacent the trivia question, the trivia question being answered by providing input within the dialog via the messenger bot, from the associated respective mobile wireless communications device, the trivia question having a difficulty level associated therewith,
        obtain answers to the trivia question from the plurality of mobile wireless communications devices, and
        for each respective user, display on the display, within the dialog via the messenger bot, on each respective one of the plurality of mobile wireless communications devices, the answers obtained to the trivia question from other respective ones of the plurality of mobile wireless communications devices,
     determine a first respective user to answer the trivia question correctly based upon the answers obtained by the messenger bot,
     determine an elapsed time between determining the first respective user to answer the trivia question correctly and prompting each of the respective users to answer the trivia question,
     generate a digital promotion having an initial redeemable value and for a given product,
     adjust the initial redeemable value of the digital promotion based upon the difficultly level and the elapsed time so that the initial redeemable value increases with a higher difficulty level and the redeemable value decreases as the elapsed time increases, and
     communicate, within the dialog via the messenger bot on the display, the digital promotion to the mobile wireless communications device associated with the first respective user to answer the trivia question correctly.

9. A non-transitory computer readable medium comprising computer executable instructions that when executed by a processor cause the processor to perform operations comprising:
   operating a messenger bot permitting a two-way dialog between each respective user of a plurality of users and the messenger bot to
     for each respective user, within the two-way dialog, generate a dialog on a display of an associated mobile wireless communications device from among a plurality thereof, prompting each respective user to answer a trivia question within an allotted time period displayed on the display in the form of a countdown timer adjacent the trivia question, the trivia question being answered from the associated respective mobile wireless communications device, the trivia question having a difficulty level associated therewith,
     obtain answers to the trivia question from the plurality of mobile wireless communications devices, and for each respective user, display on the display, within the dialog via the messenger bot, on each respective one of the plurality of mobile wireless communications devices, the answers obtained to the trivia question from other respective ones of the plurality of mobile wireless communications devices;

determining a first respective user to answer the trivia question correctly based upon the answers obtained by the messenger bot;

determining an elapsed time between determining the first respective user to answer the trivia question correctly and prompting each of the respective users to answer the trivia question;

generating a digital promotion having an initial redeemable value associated therewith and for a given product;

adjusting the initial redeemable value of the digital promotion based upon the difficultly level and the elapsed time so that the initial redeemable value increases with a higher difficulty level and the redeemable value decreases as the elapsed time increases; and communicating, within the dialog via the messenger bot on the display, the digital promotion to the mobile wireless communications device associated with the first respective user to answer the trivia question correctly.

10. The non-transitory computer readable medium of claim 9 wherein the operations comprise cooperating to communicate the digital promotion to the mobile wireless communications device associated with the first respective user via the messenger bot.

11. The non-transitory computer readable medium of claim 9 wherein the operations comprise communicating, via the messenger bot, a time expiration for permitting the users to answer the trivia question.

12. The non-transitory computer readable medium of claim 9 wherein the operations comprise communicating an incorrect answer notification to respective mobile wireless communications devices based upon a respective incorrect answer to the trivia question.

13. The digital promotion processing server of claim 5 wherein the processor is configured to generate the digital promotion for the given product from among a plurality of products based upon the trivia question.

14. The digital promotion processing server of claim 5 wherein the processor is configured to collect information from the messenger bot comprising at least one of a user name, social media profile, user date of birth, user geographic location, and desired product.

15. The method of claim 8 wherein using the digital promotion processing server comprises using the digital promotion processing server to communicate, via the messenger bot, a time expiration for permitting the users to answer the trivia question.

16. The method of claim 8 wherein using the digital promotion processing server comprises using the digital promotion processing server to communicate an incorrect answer notification to respective mobile wireless communications devices based upon a respective incorrect answer to the trivia question.

17. The method of claim 8 wherein using the digital promotion processing server comprises using the digital promotion processing server to generate the digital promotion for the given product from among a plurality of products based upon the trivia question.

18. The method of claim 8 wherein using the digital promotion processing server comprises using the digital promotion processing server to collect information from the messenger bot comprising at least one of a user name, social media profile, user date of birth, user geographic location, and desired product.

19. The non-transitory computer readable medium of claim 9 wherein the operations comprise generating the digital promotion for the given product from among a plurality of products based upon the trivia question.

20. The non-transitory computer readable medium of claim 9 wherein the operations comprise collecting information from the messenger bot comprising at least one of a user name, social media profile, user date of birth, user geographic location, and desired product.

* * * * *